May 5, 1959
H. MARQUIS
2,884,876
ROLLING PIN
Filed April 10, 1956
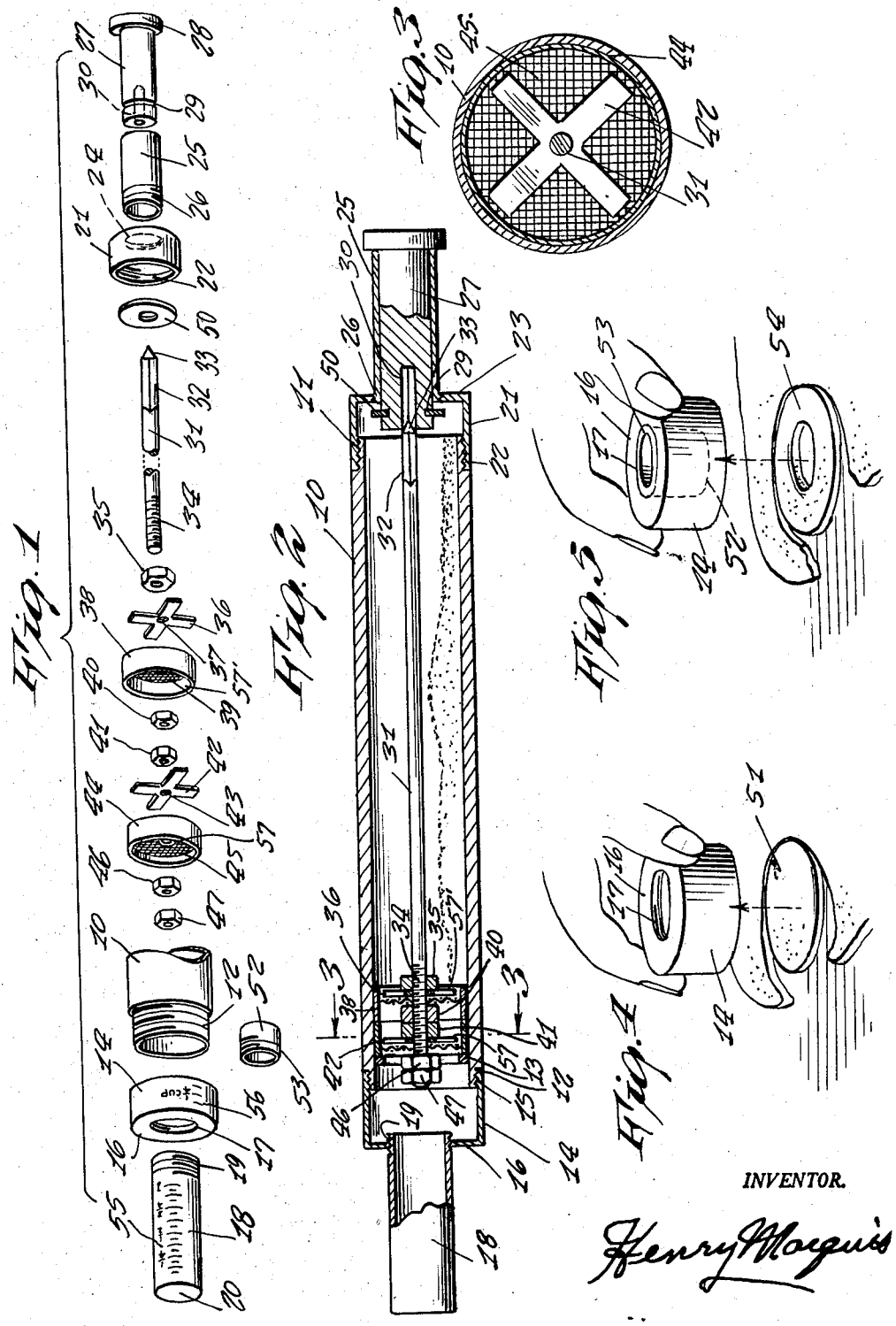
INVENTOR.
Henry Marquis

United States Patent Office 2,884,876
Patented May 5, 1959

2,884,876

ROLLING PIN

Henry Marquis, Clair, New Brunswick, Canada

Application April 10, 1956, Serial No. 577,341

1 Claim. (Cl. 107—50)

This invention relates to rolling pins.

It is an object of the present invention to provide a rolling pin which may be used both as a rolling pin and also as a flour sifter.

It is another object of the present invention to provide a rolling pin of the above type which may also be used to cut cookies and doughnuts.

Other objects of the present invention are to provide a rolling pin bearing the above objects in mind which is of simple construction, inexpensive to manufacture, is easy to use and efficient in operation.

For other objects and a better understanding of the present invention reference may be had to the following description taken in connection with the accompanying drawing, in which:

Figure 1 is an exploded perspective view shown partly broken away of the parts comprising the invention;

Fig. 2 is a longitudinal sectional view of the invention shown assembled and shown partly in elevation;

Fig. 3 is a transverse sectional view taken along the line 3—3 of Fig. 2;

Fig. 4 is a perspective view showing one of the parts being used as a cookie cutter; and Fig. 5 is a perspective view of the same part being used as a doughnut cutter.

Referring now more in detail to the drawing, 10 represents a hollow cylindrical member having the reduced externally threaded extensions 11 and 12 at opposite ends, the interior of the cylinder 10 near the extension 12 being formed with the annular ridge 13.

A hollow cylindrical cap 14 is internally threaded as at 15 and is adapted to be screwed onto the externally threaded extension 12 into abutment with the shoulder provided thereat, the cap 14 having an end closure 16 having an internally threaded opening 17. A hollow, elongated cylindrical handle 18 is provided with the externally threaded portion 19 and is adapted to be screwed into the opening 17 of the cap 14, the other end of the handle 18 being closed as at 20.

A hollow cylindrical cap 21 similar to the cap 14 is provided at one end with the internally threaded portion 22 adapted to be screwed onto the externally threaded extension 11 into abutment with the body 10, the other end of the cap 21 having a closure 23 provided with an internally threaded opening 24. An elongated hollow cylindrical handle 25 open at both ends is provided at one end with the externally threaded portion 26 adapted to be screwed into the opening 24.

A cylindrical shaft 27 slidable and rotatably received within the handle 25 is intergrally formed at its outer end with the enlarged knob 28 adapted to abut the end of the handle 25 with the other end thereof extending inwardly beyond the end wall 23 of the cap 21 and being provided with the annular groove 29. The inner end of the shaft 27 is provided with the rectangular bore 30.

An elongated rod 31 of slightly greater length than the body 10 is provided at one end with a rectangular extension 32 adapted to fit within the angular bore 30 and the conical point 33. When only the point 33 is within the bore 30, rotational movement between the shaft 27 and rod 31 is permitted. However, when the angular extension 32 is moved into the bore 30, the rod 31 and shaft 27 are locked relative to each other. The other end of the rod 31 is provided with the externally threaded portion 34.

A nut 35 is screwed onto the threaded portion 34, whereupon a first cross 36 having a central and internally threaded opening 37 is screwed onto the threaded portion 34 into abutment with nut 35. A first screen retainer is provided and includes a hollow cylindrical casing 38 open at both ends across the bottom end of which is secured the screen 39 having a central opening defined by a pair of washers 57' and which rotatably receives therethrough the thread 34 (Fig. 2). The first screen retainer is placed on the thread 34 with the bottom side up. A second nut 40 is then screwed onto the thread until the first screen retainer will just turn freely. A lock nut 41 is then screwed against the nut 40. A second cross 42 having an internally threaded central opening 43 is then screwed onto the thread 34 to abutment with the lock nut 41.

A second screen retainer identical in construction with the first screen retainer is provided and includes the hollow cylindrical casing 44 open at both ends, the upper end of which is closed by the screen 45 having a central opening defined by a pair of oppositely disposed washers 57. The second screen retainer is rotatably positioned on the thread 34 adjacent the cross 42. A fourth nut 46 is then screwed onto the thread 34 until the second screen retainer just turns freely. A lock nut 47 is then screwed onto the thread into abutment with the nut 46. The second screen retainer is placed on the rod with the bottom side down. Both of the screen retainers 38, 44 are rotatable with the tube 10 relative to the crosses 36, 42 which are fixed upon the rod 31 so as to produce a sifting action between the screens and crosses in response to relative rotation between the rod and tube 31, 10.

The rod and nuts, crosses and screen retainers thus assembled is placed within the hollow cylindrical body 10 with the inner end of the first screen retainer abutting the ridge 13 and the conical point 33 just resting within the bore 30, Fig. 2. The cap 14 is then screwed onto the end of the body 10 whereupon the handle 18 is then screwed onto the cap.

The handle 25 is then screwed into the cap 21 whereupon the shaft 27 is inserted through the handle 25 and the lock washer 50 that is conventionally split is placed in the groove 29 to limit the sliding displacement of the shaft, as will be obvious. The cap 21 is then screwed onto the other end of the body 10 and the device is ready for use. With the rod 31 rotatable relative to the shaft 27, the device may then be used in a conventional manner as a rolling pin. In the event that it is desired to sift flour, the cap 14 is unscrewed and the rectangular portion of the rod 31 is engaged with shaft 27 by turning the knob 28 back and forth and pressing the knob inwardly at the same time until the angular extension 32 of the rod 31 fits within the angular bore 30. The device is then ready for use as a flour sifter. In the event that it is desired to use the same as a rolling pin again, it is only necessary to pull the knob 28 outwardly into disengagement with the angular extension 32 from the angular bore 30, to permit the rotational movement of the shaft 27 relative to the rod 31.

The cap 14 may be unscrewed from the body 10 and from the handle 18 and used as shown in Fig. 4 as a cookie cutter, the circular inner end of the cap cutting the cookie blanks 51.

A separable sleeve 52 is provided and includes the externally threaded portion 53 and is adapted to be screwed upwardly into the internally threaded opening of the cap, as shown in Fig. 5, thus permitting the device to be used as a doughnut cutter for cutting out doughnut blanks 54.

The handle 18 may be provided with the calibrations 55 to measure teaspoons or ounces of baking powder, sugar, salt or the like. Also the cap 14 can be calibrated, as at 56 to measure fractions of a cup or ounces.

To fill the body 10, the cap 21 is unscrewed and replaced.

While various changes may be made in the detail construction, it shall be understood that such changes shall be within the spirit and scope of the present invention as defined by the appended claim.

What I claim as new and desire to protect by Letters Patent of the United States is:

A flour sifter comprising, in combination, an elongated hollow body, a first cap removably fitted on to one end of said body, a second cap having a circular central portion removably fitted on to the other end of said body, a hollow cylindrical sleeve connected to the outer end of said second cap within said central opening, a shaft slidably and rotatably mounted within said sleeve and having an enlarged knob at the outer end thereof adapted to abut the end of said sleeve, means retaining said shaft at the inner end thereof against outward displacement of said sleeve, said shaft at the inner end thereof having an angular bore, an elongated rod of slightly greater length than said body having an angular extension adapted to fit within said angular bore and terminating in a conical point adapted to be received within said angular bore, and flour sifting means secured to the other end of said rod, said body having an internal ridge adapted to abut the other end of said flour sifting means, said means for retaining said shaft against outward displacement through said sleeve comprising an annular groove at the inner end thereof, and a lock washer positioned in said groove and adapted to abut the end of said second cap on the inner face thereof.

References Cited in the file of this patent

UNITED STATES PATENTS

| | | |
|---|---|---|
| 599,171 | Fowler | Feb. 15, 1898 |
| 705,654 | Djup | July 29, 1902 |
| 1,254,298 | Anton | Jan. 22, 1918 |
| 1,384,441 | Flannigain | July 12, 1921 |
| 2,071,422 | Newlin | Feb. 23, 1937 |
| 2,673,532 | Stair | Mar. 30, 1954 |